United States Patent
Yamashita et al.

(10) Patent No.: US 9,739,639 B2
(45) Date of Patent: Aug. 22, 2017

(54) ROTATION ANGLE DETECTION DEVICE

(71) Applicant: Panasonic Intellectual Property Management Co., Ltd., Osaka (JP)

(72) Inventors: Yasuhiro Yamashita, Fukui (JP); Kiyotaka Sasanouchi, Osaka (JP); Takumi Obayashi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/889,141

(22) PCT Filed: Jun. 30, 2014

(86) PCT No.: PCT/JP2014/003461
§ 371 (c)(1),
(2) Date: Nov. 4, 2015

(87) PCT Pub. No.: WO2015/004873
PCT Pub. Date: Jan. 15, 2015

(65) Prior Publication Data
US 2016/0169705 A1   Jun. 16, 2016

(30) Foreign Application Priority Data
Jul. 10, 2013   (JP) .................. 2013-144248

(51) Int. Cl.
*G01B 7/30* (2006.01)
*G01D 5/14* (2006.01)
(Continued)

(52) U.S. Cl.
CPC .............. *G01D 5/145* (2013.01); *B60T 7/042* (2013.01); *B60T 17/22* (2013.01); *G05G 1/38* (2013.01); *B60T 2220/04* (2013.01)

(58) Field of Classification Search
CPC .......... G01P 3/443; G01P 3/488; G01P 3/487; G01P 3/481; G01P 3/685; G01P 3/66;
(Continued)

(56) References Cited

U.S. PATENT DOCUMENTS 5,055,781 A  * 10/1991  Sakakibara .............. G01B 7/30
                                                    257/E43.004
6,534,971 B1 *  3/2003  Braun ..................... G01D 5/145
                                                    324/207.2
(Continued)

FOREIGN PATENT DOCUMENTS

CN          1713793 A      12/2005
CN          1865682 A      11/2006
(Continued)

OTHER PUBLICATIONS

International Search Report of PCT application No. PCT/JP2014/003461 dated Sep. 2, 2014.
(Continued)

*Primary Examiner* — Thang Le
(74) *Attorney, Agent, or Firm* — McDermott Will & Emery LLP (57) ABSTRACT

A rotation angle detection device includes a lever, a cylindrical part, a magnet, and a magnetic sensing element. The lever includes a base and a shaft projecting in the direction of the rotation axis of the base and integrated with the base. The cylindrical part has a first end close to or in contact with the base, and a second end opposite to the first end and farther from the base than the first end. The shaft is inserted in the cylindrical part and is rotatably supported by the cylindrical part. The magnet is attached to the end of the shaft. The magnetic sensing element faces the magnet with a predetermined gap therebetween.

18 Claims, 11 Drawing Sheets

(51) Int. Cl.
  *G05G 1/38* (2008.04)
  *B60T 7/04* (2006.01)
  *B60T 17/22* (2006.01)

(58) Field of Classification Search
  CPC . G01P 3/68; G01P 3/665; G01P 1/026; G01D 5/145; G01D 5/147; G01D 5/2457; G01D 5/2013; G01D 5/2046; G01B 7/30; G01B 7/003; G01B 7/14
  USPC ............... 324/207.2–207.25, 200, 245, 259, 324/173–174, 178–179, 161, 162; 703/862.331, 862.326, 117.02
  See application file for complete search history.

(56) References Cited

U.S. PATENT DOCUMENTS

| | | | |
|---|---|---|---|
| 7,408,341 B2 * | 8/2008 | Okuya | G01D 5/145 324/207.2 |
| 2002/0060564 A1 * | 5/2002 | Yasuda | G01D 5/145 324/207.2 |
| 2002/0189584 A1 * | 12/2002 | Tanaka | F02D 11/10 123/399 |
| 2006/0261805 A1 * | 11/2006 | Okamoto | F01L 13/0063 324/207.25 |
| 2010/0275412 A1 | 11/2010 | Wang et al. | |
| 2011/0234208 A1 * | 9/2011 | Hofmockel | F02D 11/106 324/207.2 |
| 2012/0056617 A1 * | 3/2012 | Hirose | B60Q 1/441 324/207.25 |
| 2013/0221956 A1 * | 8/2013 | Kotani | G01B 7/30 324/207.25 |

FOREIGN PATENT DOCUMENTS

| | | |
|---|---|---|
| CN | 101876338 A | 11/2010 |
| JP | 62-245101 | 10/1987 |
| JP | 6-117807 | 4/1994 |
| JP | 10-038507 | 2/1998 |
| JP | 2000-121309 | 4/2000 |
| JP | 2012-073231 | 4/2012 |

OTHER PUBLICATIONS

English Translation of Chinese Search Report dated Jun. 9, 2017 for the related Chinese Patent Application No. 201480039242.X.

\* cited by examiner

ROTATION ANGLE DETECTION DEVICE

TECHNICAL FIELD

The present invention relates to a rotation angle detection device mainly used to detect the rotation angle of, for example, the brake pedal of a car.

BACKGROUND ART

With increased functionality of vehicles in recent years, various rotation angle detection devices have been developed to detect the amount by which the brake pedal is depressed or the rotation angle of the pedal, thereby providing a variety of controls. One such conventional rotation angle detection device will now be described with reference to FIGS. 8 to 10.

Figure 8:
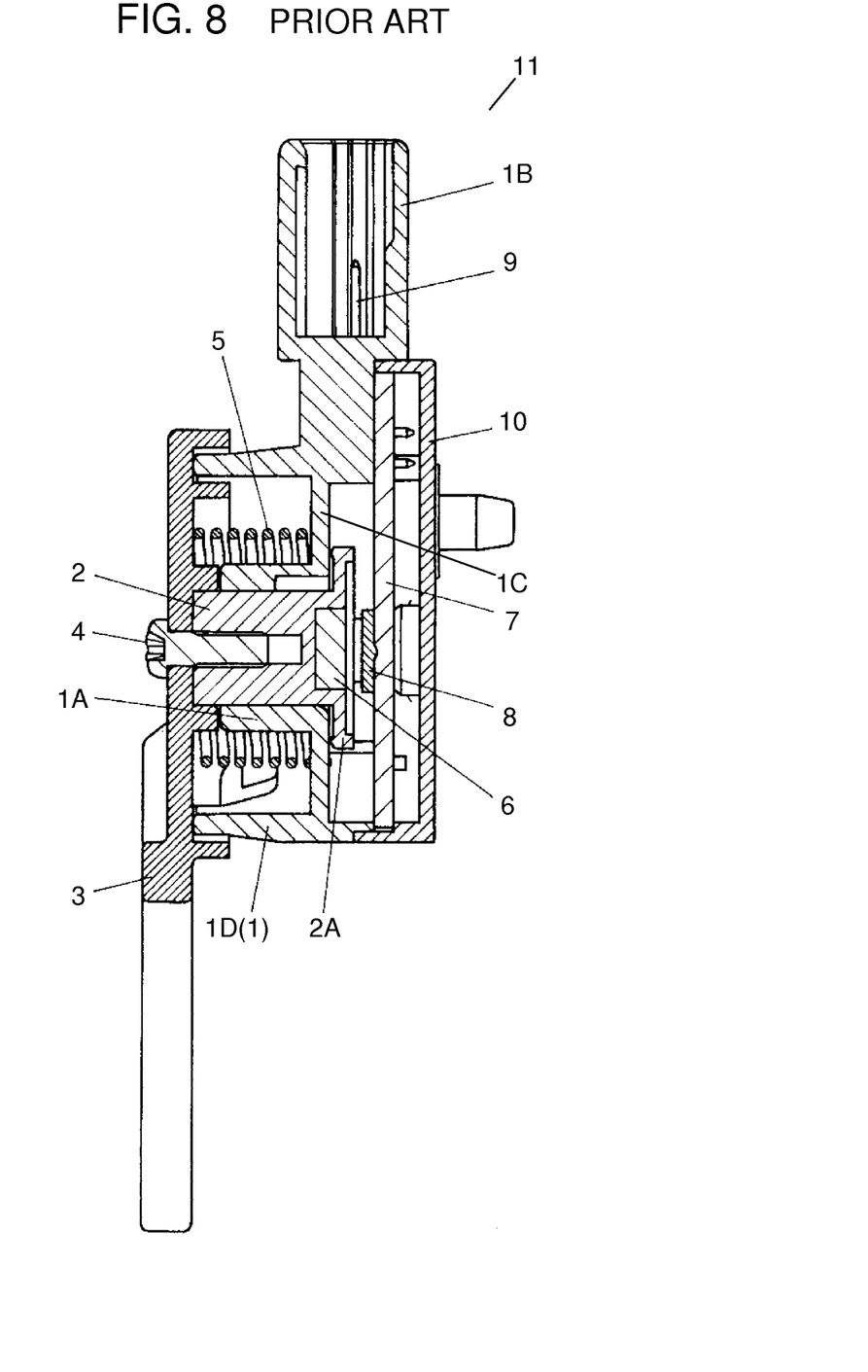
FIG. 8 is a sectional view of a conventional rotation angle detection device.
Figure 9:
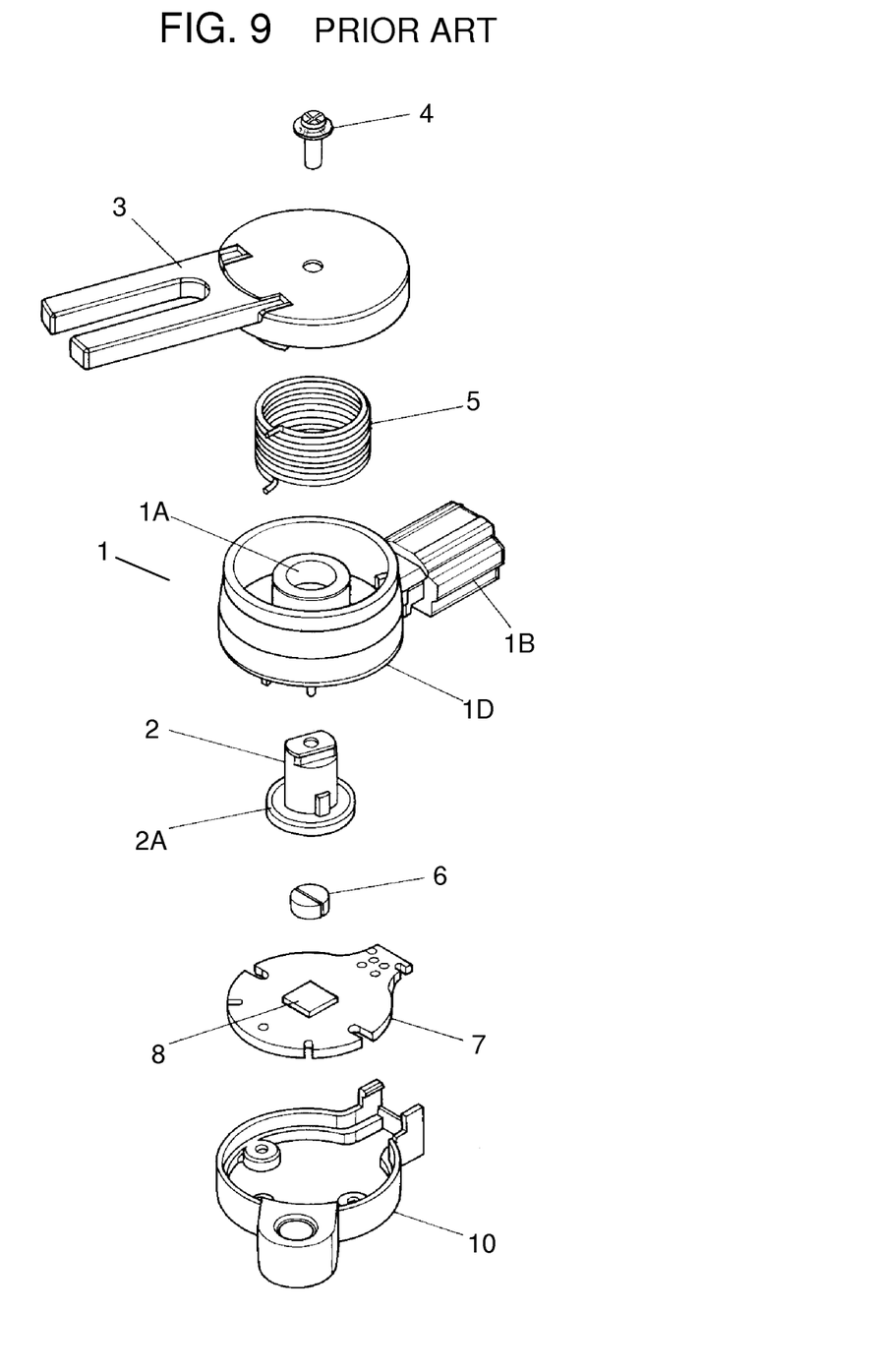
FIG. 9 is an exploded perspective view of the rotation angle detection device shown in FIG. 8.

FIGS. 8 and 9 are a sectional view and an exploded perspective view, respectively, of conventional rotation angle detection device 11. Rotation angle detection device 11 includes case 1, rotor 2, lever 3, spring 5, magnet 6, wiring board 7, magnetic sensing element 8, approximately L-shaped terminals 9, and cover 10. Case 1, rotor 2, lever 3, and cover 10 are made of an insulating resin. Spring 5 is made of steel wire and wound like a coil.

Case 1 is cylindrical and has cylindrical part 1A at a center thereof. Cylindrical part 1A is connected to an inner peripheral edge of intermediate part 1C, and an outer peripheral edge of intermediate part 1C is connected to exterior wall 1D. Rotor 2 is rotatably inserted into cylindrical part 1A and flange 2A formed on rotor 2 is in contact with intermediate part 1C.

Lever 3 is fastened with screw 4 to rotor 2. Spring 5 is placed in a slightly twisted state between lever 3 and intermediate part 1C. Spring 5 is engaged at one end with lever 3 and at the other end with intermediate part 1C. In this state, spring 5 pushes lever 3 in such a manner that lever 3 is positioned at a predetermined angle with respect to case 1.

Magnet 6 is substantially cylindrical and is fixedly attached to the center at the end of rotor 2 by, for example, insert molding. On wiring board 7, magnetic sensing element 8 such as a hall element is mounted so as to face magnet 6 with a predetermined gap therebetween. Wiring board 7 is provided on both sides with a plurality of wiring patterns (not shown).

Terminals 9 are implanted on case 1 by, for example, insert molding. Each of terminals 9 is connected to magnetic sensing element 8 via the wiring patterns at one end, and is extended to rectangular-column-shaped connector part 1B at the other end. Cover 10 is fastened to case 1 and covers the opening of case 1, wiring board 7, and other components.

Figure 10:
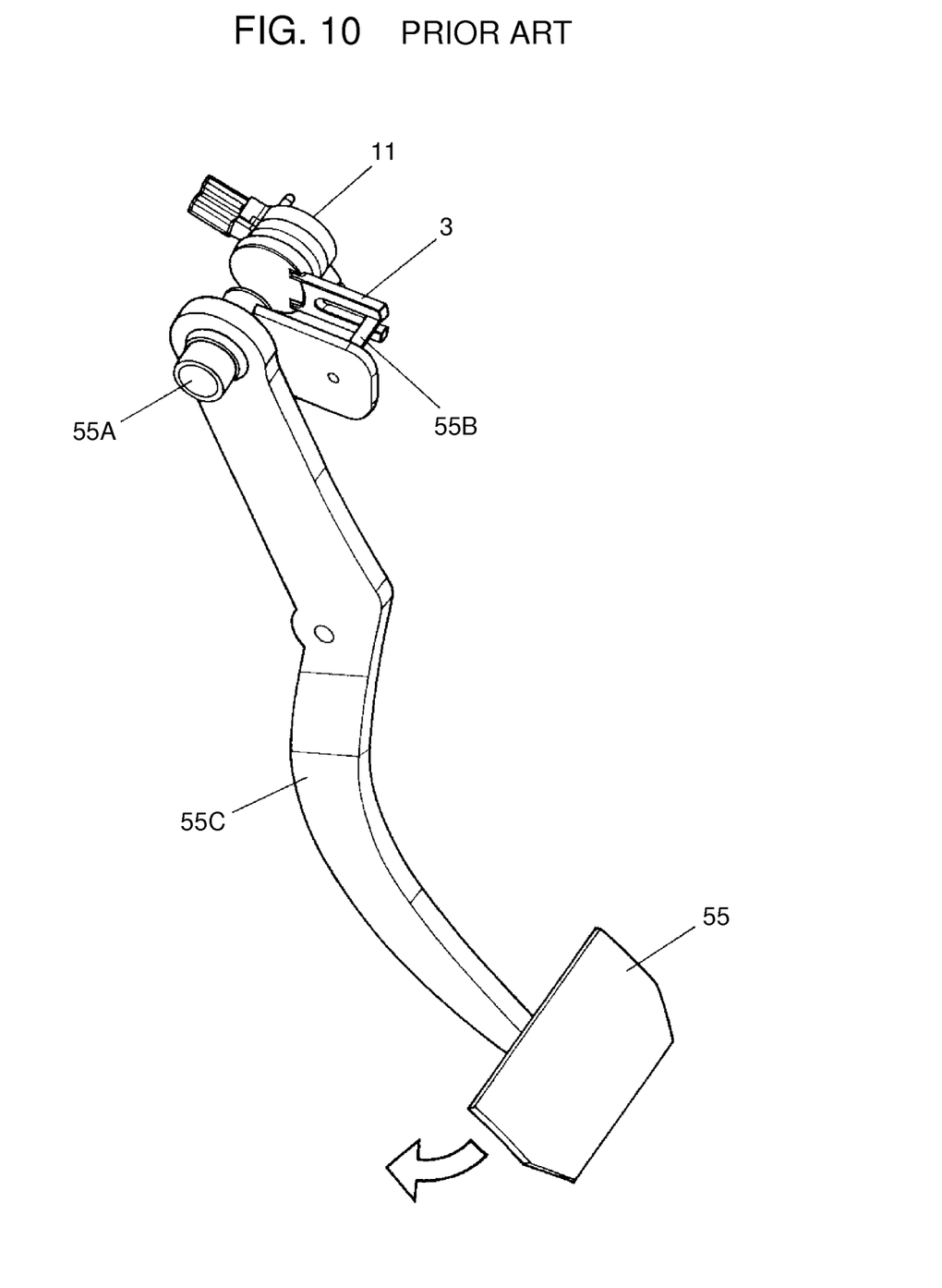
FIG. 10 is a perspective view of a brake pedal equipped with the rotation angle detection device shown in FIG. 8.

Rotation angle detection device 11 thus structured is equipped in the vicinity of rotation shaft 55A of brake pedal 55 of a vehicle as shown in FIG. 10. Lever 3 is attached to actuating pin 55B, and magnetic sensing element 8 is connected to the electronic circuit (not shown) of the vehicle via terminals 9 and lead wires (not shown).

In the above-described structure, when the driver depresses brake pedal 55, arm 55C rotates about rotation shaft 55A as a fulcrum, and actuating pin 55B makes lever 3 rotate. These rotations allow rotor 2 to rotate while twisting spring 5, thereby rotating magnet 6 attached to rotor 2. This changes the direction of the magnetic field flowing from magnet 6 to magnetic sensing element 8, and hence, changes the magnetic field strength applied to magnetic sensing element 8. Element 8 detects this magnetic field strength. The electronic circuit calculates the rotation angle of rotor 2, that is, the stroke length of brake pedal 55 from the magnetic field strength detected by magnetic sensing element 8. The vehicle is variously controlled according to the stroke length (refer to Patent Literature 1, for example).

CITATION LIST

Patent Literature

PTL 1: Japanese Unexamined Patent Application Publication No. 2012-73231

SUMMARY OF THE INVENTION

The rotation angle detection device of the present invention includes a lever, a cylindrical part, a magnet, and a magnetic sensing element. The lever includes a base and a shaft projecting in a direction of a rotation axis of the base and integrated with the base. The cylindrical part has a first end close to or in contact with the base, and a second end opposite to the first end and farther from the base than the first end. The shaft is inserted into the cylindrical part and rotatably supported by the cylindrical part. The magnet is attached to the end of the shaft. The magnetic sensing element faces the magnet with a predetermined gap therebetween. Thus, the magnet is attached to the end of the shaft projecting from the base of the lever, thereby being located precisely so as to face the magnetic sensing element. As a result, the rotation angle detection device detects the rotation angle with high accuracy and few errors.

DESCRIPTION OF EMBODIMENT

Prior to describing an exemplary embodiment of the present invention, the problem of conventional rotation angle detection device 11 shown in FIGS. 8 and 9 will now be described. In rotation angle detection device 11, rotor 2 is provided at one end with magnet 6, and is rotatably inserted in cylindrical part 1A of case 1. Lever 3 is fastened to the other end of rotor 2. Rotating lever 3 allows rotor 2 and magnet 6 to rotate. However, there is a small gap between lever 3 and rotor 2, between lever 3 and cylindrical part 1A, and between rotor 2 and cylindrical part 1A. This causes errors in the position of magnet 6, making it unable to detect the rotation angle with high accuracy.

The rotation angle detection device according to the exemplary embodiment of the present invention capable of detecting the rotation angle with higher accuracy and fewer errors than conventional device 11 will now be described with reference to FIGS. 1 to 7B.

Figure 1:
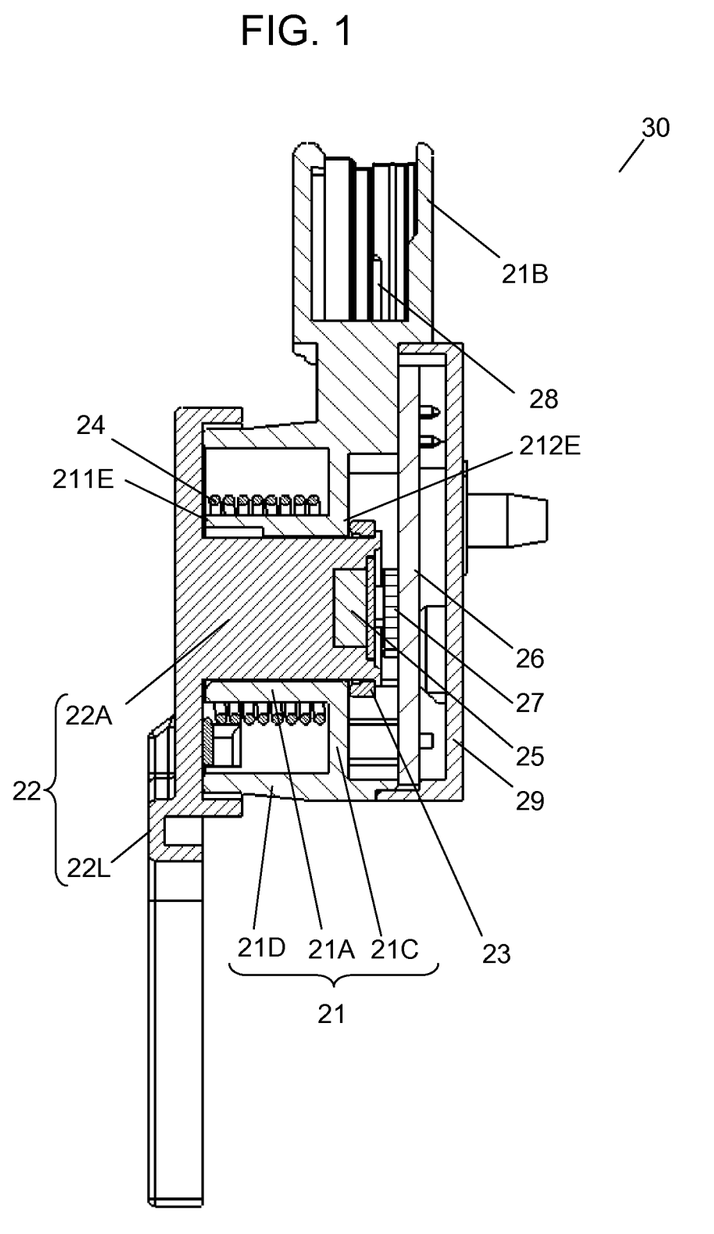
FIG. 1 is a sectional view of a rotation angle detection device according to an exemplary embodiment of the present invention.
Figure 2:
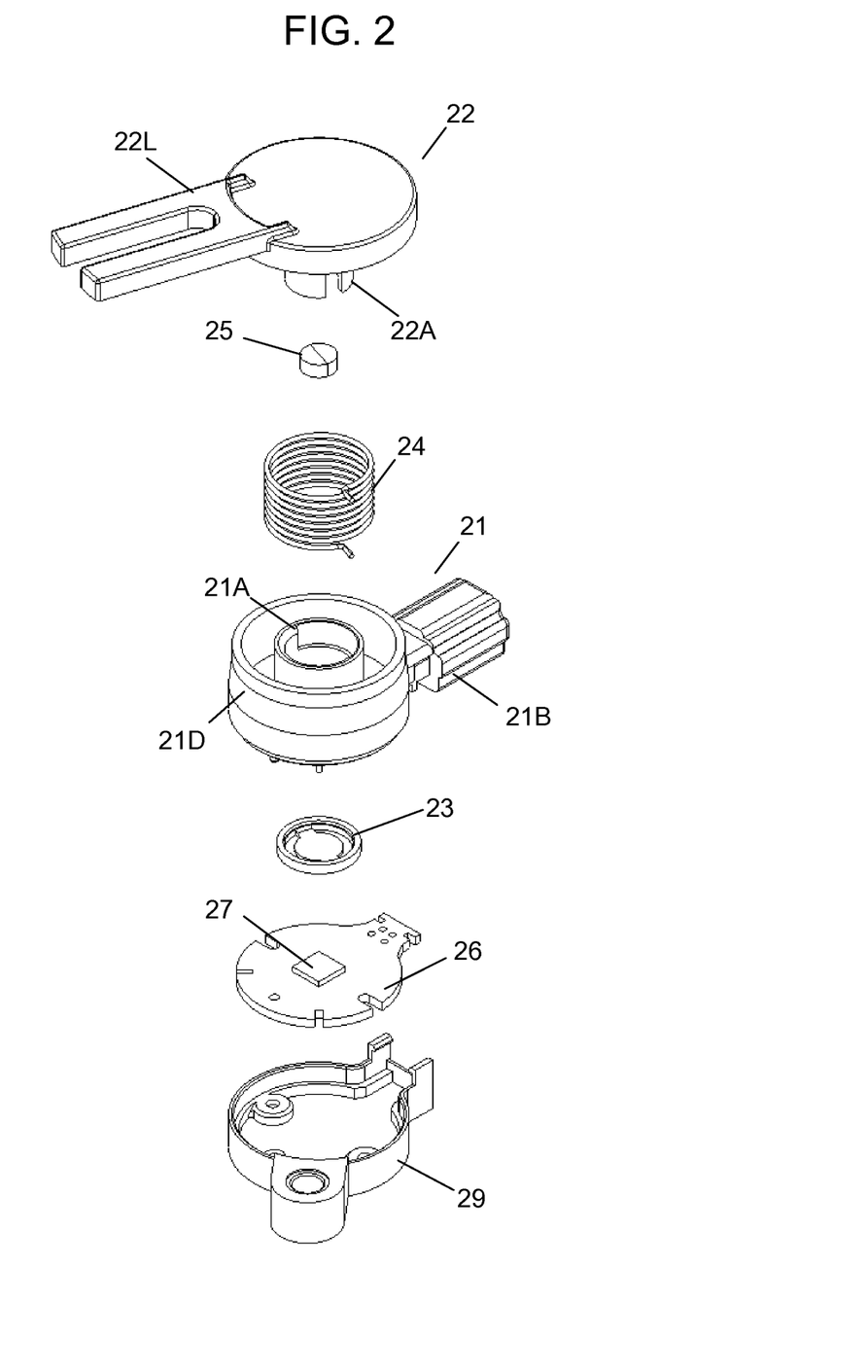
FIG. 2 is an exploded perspective view of the rotation angle detection device shown in FIG. 1.
Figure 3:
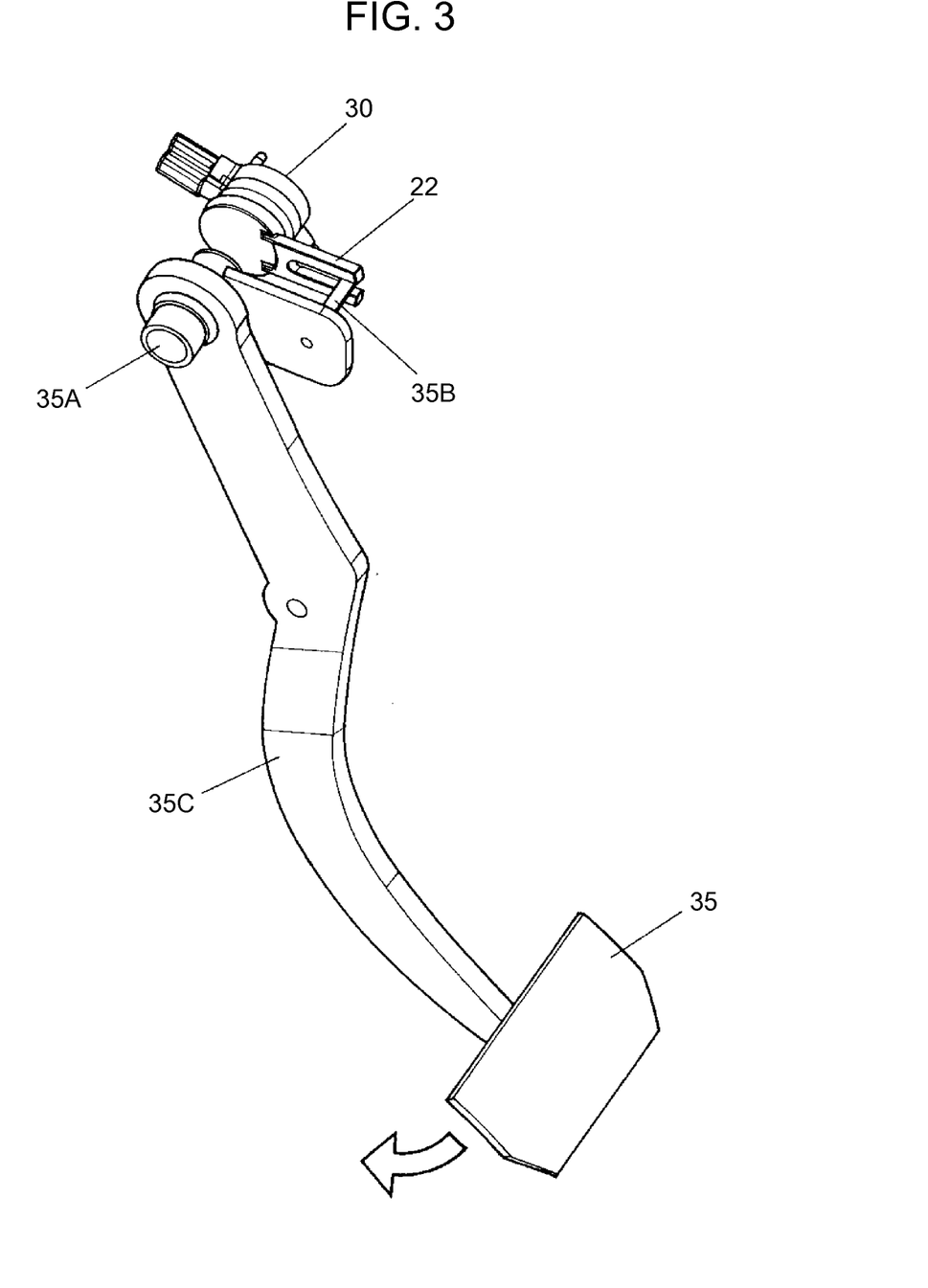
FIG. 3 is a perspective view of a brake pedal equipped with the rotation angle detection device shown in FIG. 1.

FIGS. 1 and 2 are a sectional view and an exploded perspective view, respectively, of rotation angle detection device 30 according to an exemplary embodiment of the present invention. FIG. 3 is a perspective view of a brake pedal equipped with rotation angle detection device 30.

Rotation angle detection device 30 includes lever 22, case 21 having cylindrical part 21A, magnet 25, and magnetic sensing element 27. Lever 22 includes base 22L and shaft 22A projecting in the direction of the rotation axis of base 22L. Cylindrical part 21A has first end 211E close to or in contact with base 22L, and second end 212E opposite to first end 211E and farther from base 22L than first end 211E. Supports shaft 22A is inserted in cylindrical part 21A and is rotatably supported by cylindrical part 21A. Magnet 25 is attached to the end of shaft 22A. Magnetic sensing element 27 is disposed so as to face magnet 25 with a predetermined gap therebetween.

Case 21 has cylindrical part 21A, exterior wall 21D enclosing cylindrical part 21A, and intermediate part 21C connecting cylindrical part 21A and exterior wall 21D. Case 21 is made of an insulating resin such as polybutylene terephthalate and is either cylindrical or box-shaped.

Lever 22 is made of an insulating resin such as polyoxymethylene, and includes base 22L and substantially cylindrical shaft 22A projecting in the direction of the rotation axis of base 22L as described above. Shaft 22A is rotatably inserted in cylindrical part 21A of case 21.

Magnet 25 is substantially cylindrical and is made of ferrite, Nd—Fe–B alloy, or the like. Magnet 25 is fixed to the center of the end of shaft 22A by, for example, insert molding or bonding. Magnetic sensing element 27 can be, for example, a hall element.

Rotation angle detection device 30 further includes locking body 23, spring 24, wiring board 26, terminals 28, and cover 29.

Locking body 23 is substantially discoidal and is made of an insulating resin such as polyoxymethylene. Locking body 23 is attached to the outer periphery of the end of shaft 22A of lever 22. As will be described later, the end of shaft 22A is caulked outward under heat and pressure so as to be rotatably locked to second end 212E of cylindrical part 21A.

Spring 24 is a torsion spring is made of steel wire or copper-alloy wire wound like a coil. Spring 24 is engaged with lever 22 at one end and with case 21 at the other end. More specifically, spring 24 is disposed in a slightly twisted state between cylindrical part 21A and exterior wall 21D so as to be engage with lever 22 and intermediate part 21C of case 21. In this state, spring 24 holds lever 22 at a predetermined angle position.

Wiring board 26 is made of paper phenol or glass-filled epoxy, and is provided with wiring patterns (not shown) made of, for example, copper foil on both sides thereof. Magnetic sensing element 27 is mounted by, for example, soldering on the wiring patterns on one of the surfaces of wiring board 26.

Approximately L-shaped terminals 28 are made of, for example, copper alloy. Terminals 28 are implanted on case 21 by, for example, insert molding. Each of terminals 28 is connected to magnetic sensing element 27 via wiring patterns at one end, and is extended to rectangular-column-shaped connector part 21B at the other end.

Cover 29 is made of an insulating resin such as polybutylene terephthalate. Cover 29 is fastened to case 21 via screws (not shown) and covers the opening of case 21, wiring board 26, and other components.

Rotation angle detection device 30 thus structured is equipped in the vicinity of rotation shaft 35A of brake pedal 35 of a vehicle as shown in FIG. 3. Actuating pin 35B is inserted into the tip of lever 22 (base 22L), and magnetic sensing element 27 is connected to the electronic circuit (not shown) of the vehicle via terminals 28 and lead wires (not shown).

In the above-described structure, when brake pedal 35 is depressed, arm 35C rotates about rotation shaft 35A as a fulcrum, and actuating pin 35B makes lever 22 rotate while twisting spring 24. Accordingly, magnet 25 attached to shaft 22A also rotates, thereby changing the direction of the magnetic field flowing from magnet 25 to magnetic sensing element 27. As a result, this changes the magnetic field strength applied to magnetic sensing element 27.

Magnetic sensing element 27 detects the magnetic field strength. The electronic circuit calculates the rotation angle of lever 22, that is, the stroke length of brake pedal 35 from the magnetic field strength detected by magnetic sensing element 27. The vehicle is variously controlled according to the stroke length, such as the control of a braking device and the on-off of a stop lamp.

In rotation angle detection device 30, shaft 22A projects in the direction of the rotation axis of the base of lever 22, is integrated with the base, and is rotatably inserted in cylindrical part 21A of case 21. Furthermore, magnet 25 is attached to the end of shaft 22A. Thus, magnet 25 is located precisely so as to face magnetic sensing element 27.

In other words, magnet 25 is attached to the end of shaft 22A which is integrated with base 22L of lever 22. This allows magnetic sensing element 27 to be accurately located with respect to magnet 25, while having only an error corresponding to a slight gap between the outer periphery of shaft 22A and the inner periphery of cylindrical part 21A. This prevents displacement of magnetic sensing element 27 with respect to magnet 25, allowing rotation angle detection device 30 to detect the rotation angle with high accuracy.

Figure 4A:
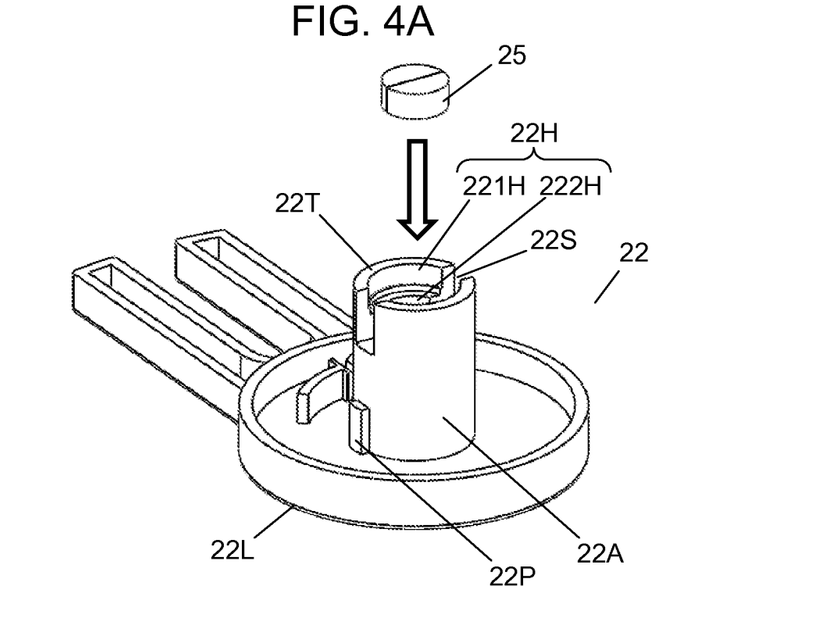
FIG. 4A is a perspective view of how a magnet is attached to a shaft of a lever of the rotation angle detection device shown in FIG. 1.

Hereinafter, the procedure for attaching magnet 25 to shaft 22A will be described with reference to FIG. 4A. FIG. 4A is a perspective view of how magnet 25 is attached to lever 22.

Shaft 22A is provided with hole 22H extending from end 22T toward base 22L. Hole 22H is formed of large-diameter portion 221H close to end 22T and small-diameter portion 222H close to base 22L.

Shaft 22A is further provided with slits 22S extending from end 22T toward base 22L in the direction of the rotation axis of lever 22. Slits 22S communicate with both large-diameter portion 221H and small-diameter portion 222H.

Magnet 25 is fixed into small-diameter portion 222H. Magnet 25 is insert-molded or bonded to shaft 22A, or press-fitted into small-diameter portion 222H. The fixing method is not particularly limited.

Since slits 22S communicate with small-diameter portion 222H, magnet 25 can be easily positioned while being fixed. Alternatively, slits 22S may communicate only with large-diameter portion 221H, and magnet 25 may be magnetized after being fixed to shaft 22A.

Figure 4B:
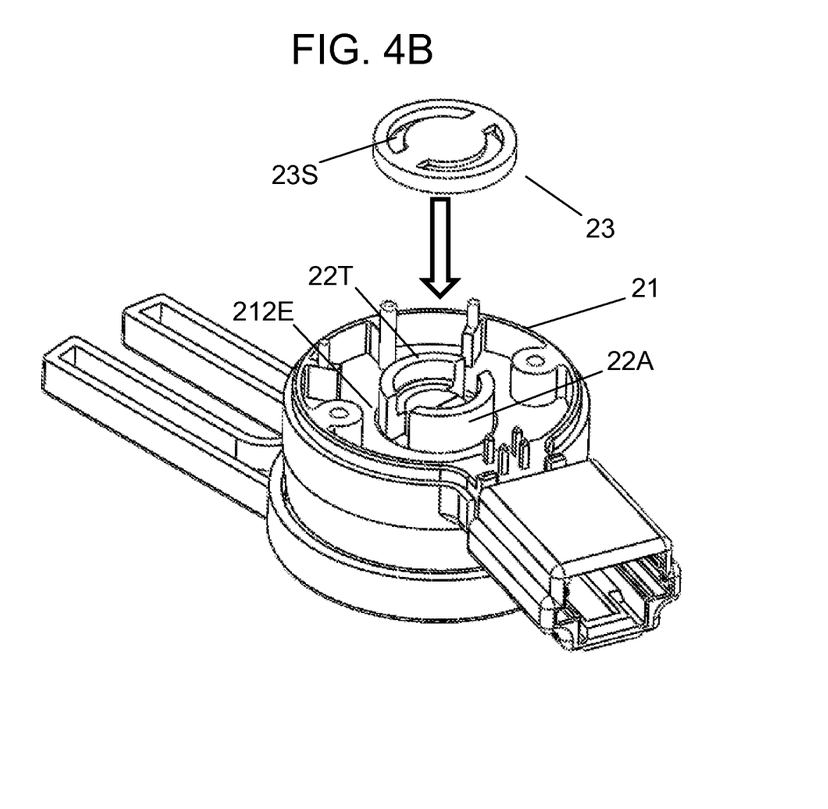
FIG. 4B is a perspective view of a state where the shaft of the lever is inserted into a cylindrical part of a case after the state shown in FIG. 4A.
Figures 4C, 4D:
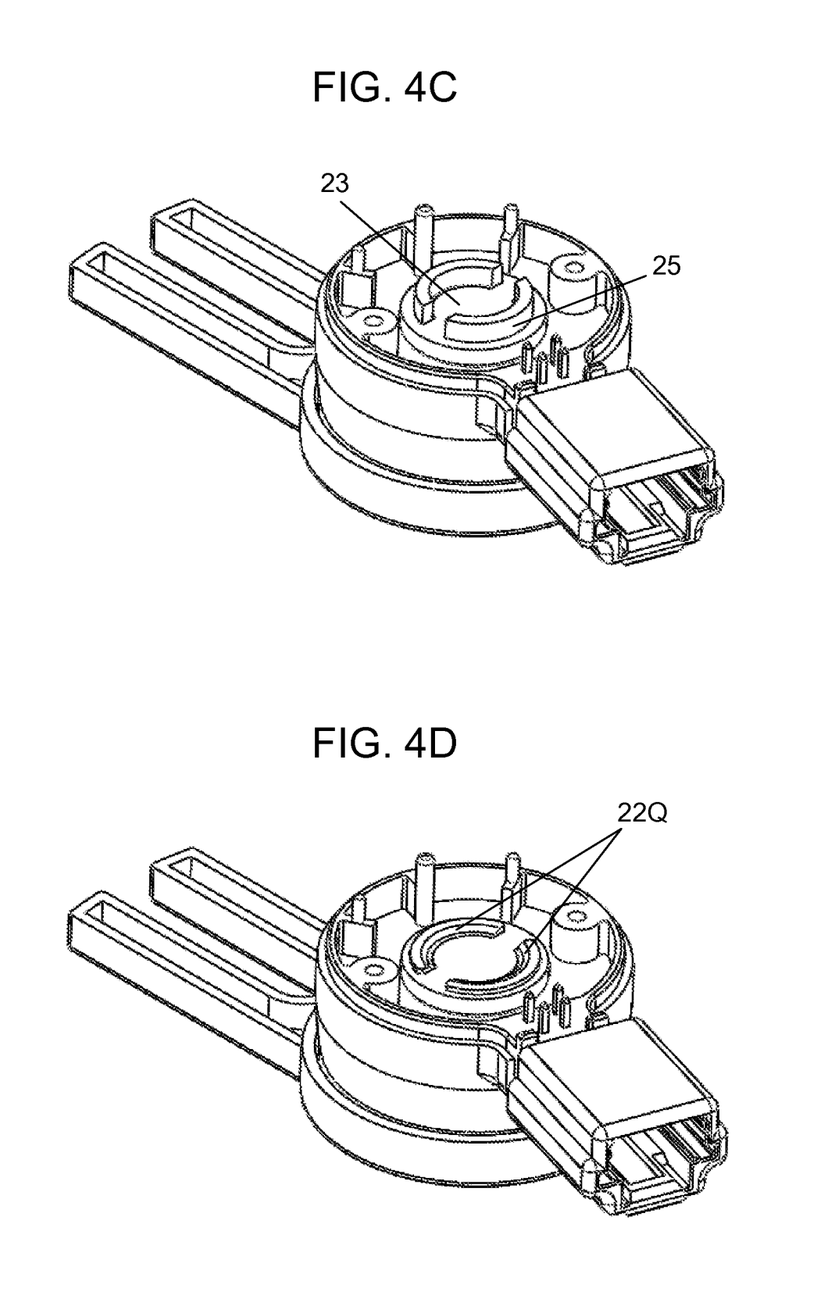
FIG. 4C is a perspective view of a state where a locking body is attached to the shaft of the lever after the state shown in FIG. 4B.
FIG. 4D is a perspective view of a state where the locking body is fixed to the shaft of the lever by thermally caulking the end of the shaft after the state shown in FIG. 4C.
Figure 5A:
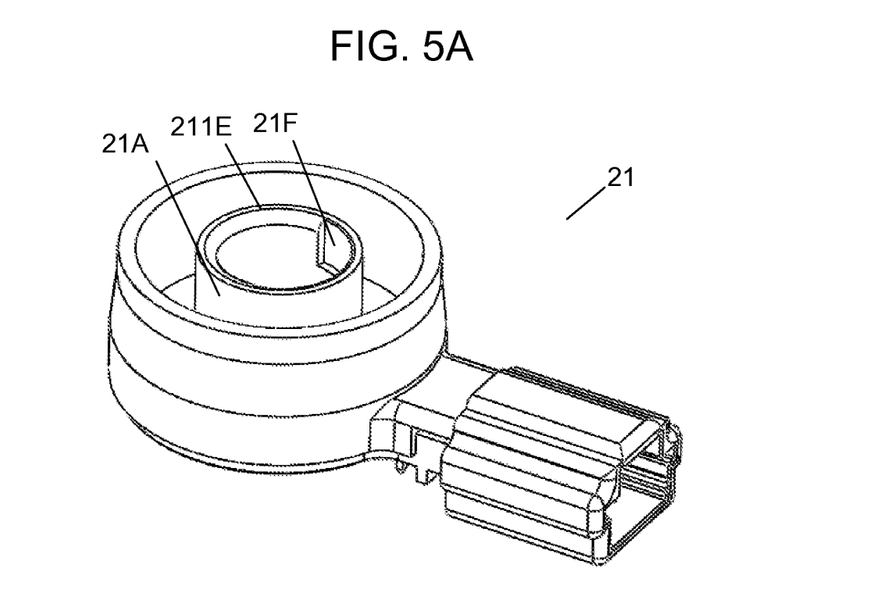
FIG. 5A is a schematic perspective view of the case of the rotation angle detection device shown in FIG. 1.

Next, the procedure for combining lever 22 and case 21, and then the procedure for attaching locking body 23 to lever 22 will be described with reference to FIGS. 4B to 5A. FIG. 4B is a perspective view of a state where shaft 22A is inserted into cylindrical part 21A of case 21 after the state shown in FIG. 4A. FIG. 4C is a perspective view of a state where locking body 23 is attached to shaft 22A after the state shown in FIG. 4B. FIG. 4D is a perspective view of a state where locking body 23 is fixed to shaft 22A by thermally caulking end 22T of shaft 22A after the state shown in FIG. 4C. FIG. 5A is a schematic perspective view of case 21.

After magnet 25 is attached to shaft 22A as shown in FIG. 4A, shaft 22A is inserted into cylindrical part 21A as shown in FIG. 4B. In this situation, end 22T of shaft 22A is exposed from second end 212E of cylindrical part 21A. Then, locking body 23 is attached to the outer periphery of the exposed portion of end 22T. At this moment, end 22T is inserted into arc slit 23S of locking body 23. This results in the state shown in FIG. 4C.

Locking body 23 has an outer diameter larger than the inner diameter of cylindrical part 21A. The thin-walled portion of shaft 22A due to large-diameter portion 221H is heated to deform outward so as to expand slits 22S, thereby forming thermally caulked part 22Q as shown in FIG. 4D. Thus, locking body 23 is fixed to end 22T of shaft 22A. Locking body 23 prevents shaft 22A from being detached from cylindrical part 21A during normal use. In other words, end 22T of shaft 22A is rotatably engaged by second end 212E of cylindrical part 21A.

It is preferable that the bond strength between shaft 22A and locking body 23 be smaller than the tensile strength between base 22L and shaft 22A. In this condition, if lever 22 becomes detached from case 21 due to a large impact applied to lever 22, locking body 23 and shaft 22A are disjoined from each other, and thus magnet 25 comes out of case 21 together with lever 22. This prevents magnetic sensing element 27 from outputting an incorrect detection signal to the electronic circuit.

That is, if lever 22 receives a large impact, the impact force causes locking body 23 to separate from shaft 22A, so that lever 22 as well as magnet 25 attached to shaft 22A are detached from case 21. As a result, magnetic sensing element 27 becomes unable to detect the magnetic field strength of magnet 25, allowing the electronic circuit to detect abnormalities in rotation angle detection device 30.

As described above, this type of rotation angle detection device is attached to brake pedal 35 so as to detect the stroke length. In the case that this device is mounted on a hybrid electric vehicle or an electric vehicle, the electronic circuit in the vehicle controls the operation of the regenerative system according to the detected stroke length. As described above, in the case of using rotation angle detection device 30, even if a large impact is applied to lever 22 via brake pedal 35, and lever 22 becomes detached from case 21, the electronic circuit can easily detect the abnormality. After this, for example, the electronic circuit of the vehicle can suspend the regenerative system so as to prevent malfunction such as unnecessary continuous operation, and hence, to prevent influence on the operation of the vehicle.

Figure 5B:
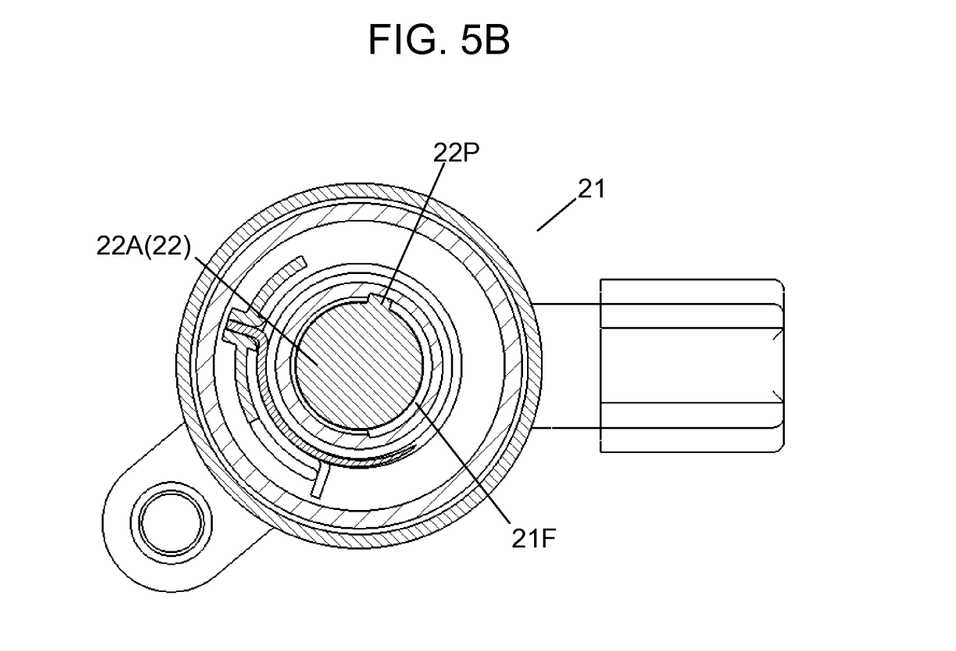
FIG. 5B is a plan view showing the positional relationship between the case and the lever in the rotation angle detection device shown in FIG. 1.

Next, a structure for controlling the rotational positional relationship between case 21 and lever 22 will now be described with reference to FIGS. 4A, 5A, and 5B. FIG. 5B is a plan view showing the positional relationship between case 21 and lever 22.

As shown in FIG. 4A, shaft 22A has protrusion 22P at a position closer to the joint with base 22L than to end 22T. On the other hand, as shown in FIG. 5A, cylindrical part 21A has engagement recess 21F at first end 211E. When shaft 22A is inserted into cylindrical part 21A, engagement recess 21F accommodates protrusion 22P. As shown in FIG. 5B, engagement recess 21F partially extends along the inner periphery of cylindrical part 21A.

When lever 22 is rotated with respect to case 21, shaft 22A rotates with respect to cylindrical part 21A. In this situation, protrusion 22P is accommodated in engagement recess 21F and does not move beyond either end of engagement recess 21F. As a result, the rotational positional relationship between case 21 and lever 22 is controlled within a certain range.

Figure 6A:
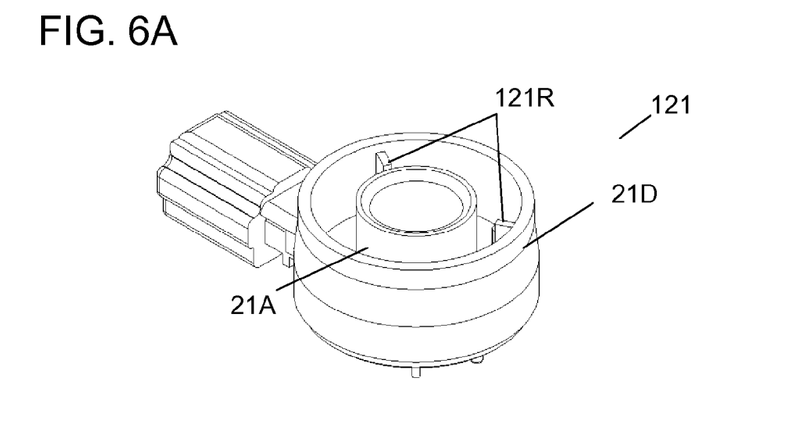
FIG. 6A is a schematic perspective view of another case of the rotation angle detection device shown in FIG. 1.
Figure 6B:
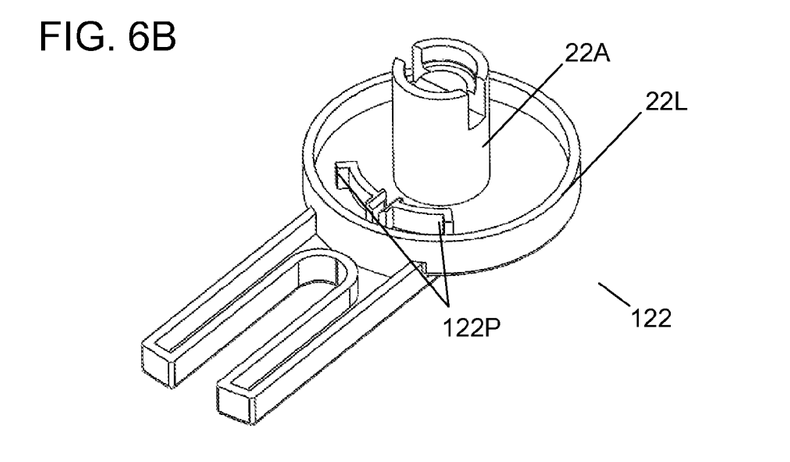
FIG. 6B is a perspective view of a lever used together with the case shown in FIG. 6A.
Figure 6C:
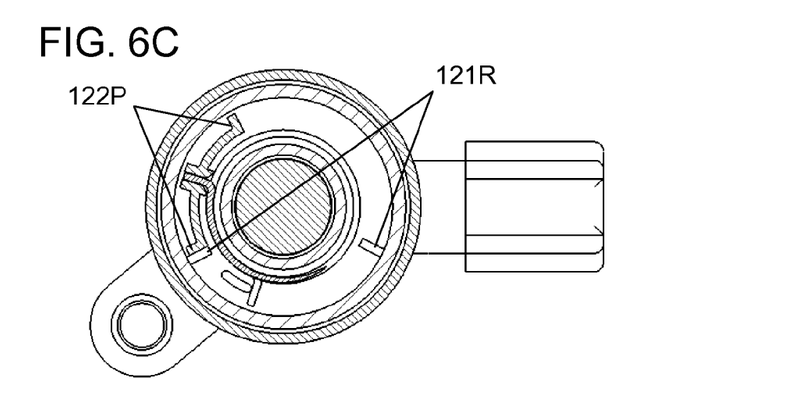
FIG. 6C is a plan view showing the positional relationship between the case shown in FIG. 6A and the lever shown in FIG. 6B.

Note that the above-described structure is not the only approach to controlling the range of the rotation of lever 22 with respect to case 21. Other approaches will now be described with reference to FIGS. 6A to 6C. FIG. 6A is a schematic perspective view of case 121. FIG. 6B is a perspective view of lever 122 used together with case 121. FIG. 6C is a plan view showing the positional relationship between case 121 and lever 122.

Case 121 has two regulating ribs 121R instead of engagement recess 21F shown in FIG. 5A. Regulating ribs 121R are formed between cylindrical part 21A and exterior wall 21D. Lever 122, on the other hand, has regulating protrusions 122P instead of protrusion 22P shown in FIG. 4A. Regulating protrusions 122P are formed around shaft 22A in such a manner as to project from base 22L and positioned between cylindrical part 21A and exterior wall 21D. FIG. 6B shows two regulating protrusions 122P, but it is also possible to provide a single regulating protrusion 122P. Providing two regulating protrusions 122P allows spring 24 to be engaged with and between them.

When lever 122 is rotated with respect to case 121, shaft 22A rotates with respect to cylindrical part 21A. At this moment, regulating protrusions 122P move in the circumferential direction between cylindrical part 21A and exterior wall 21D. Regulating ribs 121R formed between cylindrical part 21A and exterior wall 21D prevent regulating protrusions 122P from deviating from the area between regulating ribs 121R. As a result, the rotational positional relationship between case 121 and lever 122 is controlled within a certain range.

Figure 7A:
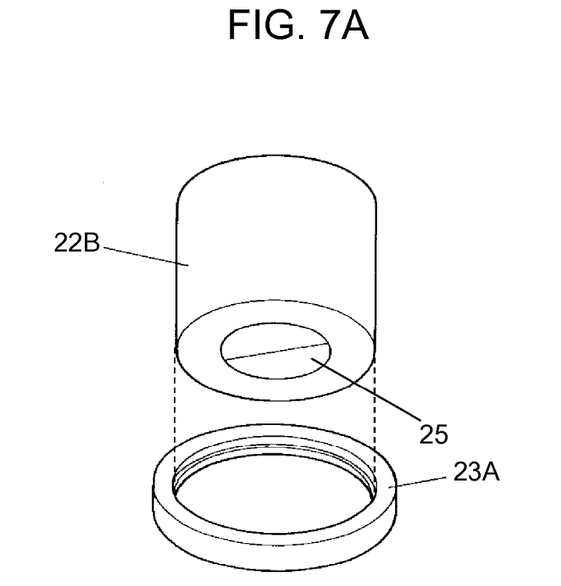
FIG. 7A is a partial perspective view of another rotation angle detection device according to the exemplary embodiment of the present invention.
Figure 7B:
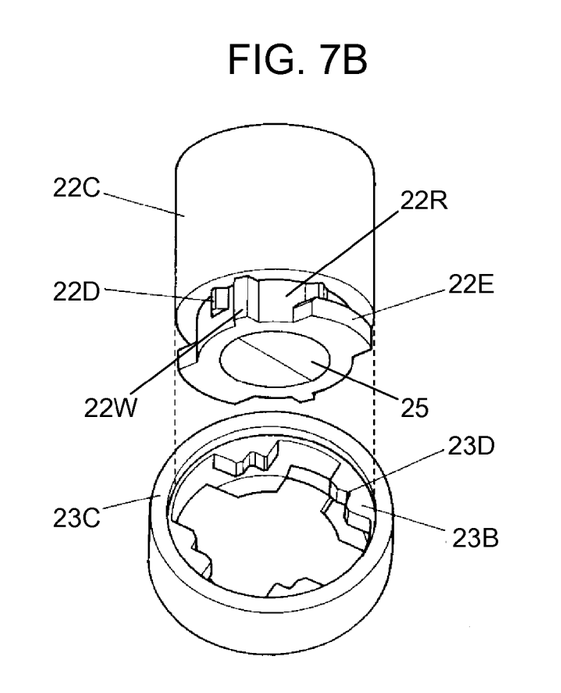
FIG. 7B is a partial perspective view of further another rotation angle detection device according to the exemplary embodiment of the present invention.

Next, other configurations of the shaft of lever 22 and locking body 23 will now be described with reference to FIGS. 7A and 7B. FIGS. 7A and 7B are partial perspective views of other rotation angle detection devices according to the exemplary embodiment of the present invention.

In the configuration shown in FIG. 7A, locking body 23A is attached to the outer peripheral end of shaft 22B of lever 22, and these are fixed together by laser, ultrasonic welding, or other methods. In this case, locking body 23A is partially welded to the end of shaft 22B. This is another approach to rotatably engaging the end of shaft 22B to second end 212E of cylindrical part 21A.

In the configuration shown in FIG. 7B, ring-shaped locking body 23C having ribs 23B along the inner periphery. Each of ribs 23B is provided with recess 23D at the center thereof. On the other hand, shaft 22C is provided with walls 22E and projections 22D at the end thereof. Walls 22E are connected to shaft 22C via joint 22R, which is thinner than shaft 22C. Walls 22E project in the diametrical direction of shaft 22C. Projections 22D project from joint 22R in the diametrical direction of joint 22R. The distance between shaft 22C and walls 22E is identical to or slightly larger than the thickness of ribs 23B. The distance between ribs 23B corresponding to walls 22E is large enough for walls 22E to pass through.

In this configuration, walls 22E are inserted between ribs 23B of locking body 23C, and then locking body 23C is rotated to engage projections 22D with recess 23D and to bring walls 22E into contact with the bottom surfaces of ribs 23B. In other words, the surfaces of ribs 23B perpendicular to the axial direction of shaft 22C are in contact with the surfaces of walls 22E perpendicular to the axial direction of shaft 22C. Thus, the end of shaft 22C can be rotatably engaged to second end 212E of cylindrical part 21A. FIG. 7B shows two ribs 23B, but the number of ribs 23B is not limited.

It is preferable to provide locking wall 22W extending throughout the length of joint 22R in the axial direction and projecting from a portion of joint 22R between walls 22E. When walls 22E are inserted between ribs 23B, locking wall 22W is inserted into the space between ribs 23B into which walls 22E are not inserted. If rotated in this condition, locking body 23C becomes unable to rotate any further when locking wall 22W hits the side surface of ribs 23B. This ensures that walls 22E are brought into contact with the bottom surfaces of ribs 23B.

Alternatively, it is possible to provide a plurality of outward-projecting claws at the bottom end of shaft 22A, and to make these claws come into contact with second end 212E of cylindrical part 21A of case 21 such that the end of shaft is rotatably engaged to second end 212E of cylindrical part 21A. This configuration provides the same effect as the above-described configuration although the strength to hold shaft 22A is slightly lower.

INDUSTRIAL APPLICABILITY

The rotation angle detection device according to the present invention can detect the rotation angle with high accuracy, and hence is useful to operate mainly the brake pedal of a car.

REFERENCE MARKS IN THE DRAWINGS 21, 121 case
21A cylindrical part
21B connector part
21C intermediate part
21D exterior wall
21F engagement recess
22, 122 lever
22A, 22B, 22C shaft
22D projection
22E wall
22H hole
22L base
22P protrusion
22Q thermally caulked part
22R joint
22S slit
22T end
22W locking wall
23, 23A, 23C locking body
23B rib
23D recess
23S arc slit
24 spring
25 magnet
26 wiring board
27 magnetic sensing element
28 terminal
29 cover
30 rotation angle detection device
35 brake pedal
35A rotation shaft
35B actuating pin
35C arm
121R regulating rib
122P regulating protrusion
211E first end
212E second end
221H large-diameter portion
222H small-diameter portion

The invention claimed is:

1. A rotation angle detection device comprising:
a lever including:
a base; and
a shaft projecting in a direction of a rotation axis of the base and integrated with the base;
a cylindrical part, into which the shaft is inserted, rotatably supporting the shaft and having:
a first end close to or in contact with the base; and
a second end opposite to the first end and farther from the base than the first end;
a magnet attached to an end of the shaft;
a magnetic sensing element facing the magnet with a predetermined gap therebetween; and
a locking body fixed to the end of the shaft and having an outer diameter larger than an inner diameter of the cylindrical part,
wherein the shaft is provided with a slit extending from the end in a direction parallel to the rotation axis; and
the locking body is fixed to the end of the shaft by thermally caulking a portion, which includes the slit, of the shaft.

2. The rotation angle detection device according to claim 1, wherein the end of the shaft is rotatably engaged with the second end of the cylindrical part.

3. The rotation angle detection device according to claim 1, wherein an engaging strength between the shaft and the locking body is smaller than a tensile strength between the base and the shaft.

4. The rotation angle detection device according to claim 1, wherein the locking body is partially welded to the end of the shaft.

5. The rotation angle detection device according to claim 1, wherein the locking body is ring-shaped and has a plurality of ribs along an inner periphery thereof, each of the ribs having a recess at a center, a joint thinner than the shaft, a wall projecting in a direction of a diameter of the shaft via the joint, and a projection projecting from the joint in a direction of a diameter of the joint are provided at the end of the shaft, the projection is engaged with the recess, and the ribs have surfaces perpendicular to an axial direction of the shaft, the wall has a surface perpendicular to the axial direction of the shaft, and the surfaces of the ribs are in contact with the surface of the wall.

6. The rotation angle detection device according to claim 1, wherein the shaft has a protrusion at a position closer to a joint of the shaft with the base than to the end, and the cylindrical part has, at the first end, an engagement recess partially extending along an inner periphery of the cylindrical part so as to accommodate the protrusion.

7. The rotation angle detection device according to claim 1, further comprising a case including:

the cylindrical part;

an exterior wall enclosing the cylindrical part; and an intermediate part connecting the cylindrical part and the exterior wall.

8. The rotation angle detection device according to claim 7, wherein the case further includes a regulating rib between the cylindrical part and the exterior wall, and the lever further includes a regulating protrusion around the shaft to project from the base and be inserted between the cylindrical part and the exterior wall.

9. The rotation angle detection device according to claim 7, further comprising a torsion spring disposed between the cylindrical part and the exterior wall and engaged with the lever and the intermediate part.

10. A rotation angle detection device comprising:

a lever including:

a base; and a shaft projecting in a direction of a rotation axis of the base and integrated with the base;

a cylindrical part, into which the shaft is inserted, rotatably supporting the shaft and having:

a first end close to or in contact with the base; and a second end opposite to the first end and farther from the base than the first end;

a magnet attached to an end of the shaft;

a magnetic sensing element facing the magnet with a predetermined gap therebetween; and a locking body fixed to the end of the shaft and having an outer diameter larger than an inner diameter of the cylindrical part, wherein the locking body is ring-shaped and has a plurality of ribs along an inner periphery thereof, each of the ribs having a recess at a center, a joint thinner than the shaft, a wall projecting in a direction of a diameter of the shaft via the joint, and a projection projecting from the joint in a direction of a diameter of the joint are provided at the end of the shaft, the projection is engaged with the recess, and the ribs have surfaces perpendicular to an axial direction of the shaft, the wall has a surface perpendicular to the axial direction of the shaft, and the surfaces of the ribs are in contact with the surface of the wall.

11. The rotation angle detection device according to claim 10, wherein the end of the shaft is rotatably engaged with the second end of the cylindrical part.

12. The rotation angle detection device according to claim 10, wherein an engaging strength between the shaft and the locking body is smaller than a tensile strength between the base and the shaft.

13. The rotation angle detection device according to claim 10, wherein the locking body is partially welded to the end of the shaft.

14. The rotation angle detection device according to claim 10, wherein the shaft has a protrusion at a position closer to a joint of the shaft with the base than to the end, and the cylindrical part has, at the first end, an engagement recess partially extending along an inner periphery of the cylindrical part so as to accommodate the protrusion.

15. The rotation angle detection device according to claim 10, further comprising a case including:

the cylindrical part;

an exterior wall enclosing the cylindrical part; and an intermediate part connecting the cylindrical part and the exterior wall.

16. The rotation angle detection device according to claim 15, wherein the case further includes a regulating rib between the cylindrical part and the exterior wall, and the lever further includes a regulating protrusion around the shaft to project from the base and be inserted between the cylindrical part and the exterior wall.

17. The rotation angle detection device according to claim 15, further comprising a torsion spring disposed between the cylindrical part and the exterior wall and engaged with the lever and the intermediate part.

18. A rotation angle detection device comprising:

a lever including:

a base; and a shaft projecting in a direction of a rotation axis of the base and integrated with the base;

a cylindrical part, into which the shaft is inserted, rotatably supporting the shaft and having:

a first end close to or in contact with the base; and a second end opposite to the first end and farther from the base than the first end;

a magnet attached to an end of the shaft; and a magnetic sensing element facing the magnet with a predetermined gap therebetween, wherein the shaft has a protrusion at a position closer to a joint of the shaft with the base than to the end, and the cylindrical part has, at the first end, an engagement recess partially extending along an inner periphery of the cylindrical part so as to accommodate the protrusion.

* * * * *